United States Patent [19]

Lücking et al.

[11] Patent Number: 5,791,603
[45] Date of Patent: Aug. 11, 1998

[54] APPARATUS FOR CONTINUOUSLY MEASURING THE POSITION OF A MOVING RAIL VEHICLE

[75] Inventors: Manfred Lücking; Ulrich P. Vogt, both of Essen; Roland Börner, Krefeld, all of Germany

[73] Assignee: Krupp Fordertechnik GmbH, Essen, Germany

[21] Appl. No.: 798,620

[22] Filed: Feb. 11, 1997

[30] Foreign Application Priority Data

Mar. 8, 1996 [DE] Germany ............ 196 09 035.0

[51] Int. Cl.[6] .................................................. B61L 25/02
[52] U.S. Cl. .................... 246/122 R; 246/201; 246/204
[58] Field of Search ...................... 246/122 R, 201, 246/203, 203 C, 203 D, 204, 206, 246

[56] References Cited

U.S. PATENT DOCUMENTS

| | | | |
|---|---|---|---|
| 1,235,880 | 8/1917 | Culton | 246/204 |
| 1,703,055 | 2/1929 | Bourg | 246/204 |
| 4,076,162 | 2/1978 | Hoge | 246/247 |
| 4,630,792 | 12/1986 | Frielinghaus | 246/204 |
| 4,886,471 | 12/1989 | Fleshman, Jr. | 439/587 |
| 4,944,474 | 7/1990 | Jones . | |
| 5,601,259 | 2/1997 | DiChiara | 246/203 C |
| 5,621,195 | 4/1997 | Taylor et al. | 246/247 |

FOREIGN PATENT DOCUMENTS

| | | |
|---|---|---|
| 937 242 | 12/1946 | France . |
| 2 256 062 | 7/1975 | France . |
| 938 072 | 1/1956 | Germany . |
| 42 32 171 | 3/1994 | Germany . |
| 42 33 007 | 4/1994 | Germany . |
| 42 13 810 | 5/1995 | Germany . |
| 295 07 967 U | 9/1995 | Germany . |

*Primary Examiner*—S. Joseph Morano
*Attorney, Agent, or Firm*—Herbert Dubno; Yuri Kateshov

[57] ABSTRACT

A device for the precise determination of the position of a moving railroad vehicle on a track in a transloader measurement stretch has a multiplicity of switch elements arrayed along one of the rails and actuators positioned to be engaged either by the felly portion of the wheel or the flange portion of the wheel regardless of where the wheel and the track are and in all positions of the wheel on the rail in its sinusoidal movement back and forth as the wheel travels along the rail.

18 Claims, 5 Drawing Sheets

APPARATUS FOR CONTINUOUSLY MEASURING THE POSITION OF A MOVING RAIL VEHICLE

SPECIFICATION

FIELD OF THE INVENTION

Our present invention relates to an apparatus or device for continuously measuring the instantaneous position of a rail vehicle while it is in motion along a track over a measurement stretch thereof so that, from the measured position as determined by a computer, a transloading system can be controlled. The invention thus encompasses a transloading system utilizing the improved position measuring device of the invention as well as the position measuring device itself.

BACKGROUND OF THE INVENTION

Transloading systems are provided for transferring load units like containers, trailers, semitrailers and other bulk containers between a rail vehicle and a station for storage of such load units or some other vehicle, e.g. a truck or other rail vehicle. A typical transloading system can comprise a portal crane which lifts the load unit from the rail vehicle and transfers it to the storage location for the other vehicle or picks up a load unit from a storage location or some other vehicle and deposits it upon the rail vehicle. The ideal in such a transloading system is to be able to carry out the transloading operation on the fly, i.e. while the rail vehicle, at least, is in motion.

For this purpose, the transloader must be accurately positioned with respect to the rail vehicle and its motion must be synchronized with that of the rail vehicle. To this end it is essential to determine with high precision the exact position and speed of the rail vehicle.

German patent document DE 42 33 007 A1 describes a mechanical unit for detecting the position of a rail unit. Not only is the system described in this patent document expensive to construct and maintain but, because of its complexity, its reliability may be in question.

OBJECTS OF THE INVENTION

It is, therefore, the principal object of the present invention to provide an improved device for continuously measuring the position of an instantaneous a moving rail vehicle which is free from the drawbacks of the earlier system, i.e. can provide an accurate measurement at a lower cost and with greater reliability.

Another object of this invention is to provide a low cost measuring unit which can extend along the measuring stretch of a transloader for registering the position of a moving railway vehicle and enabling control of a transloader.

It is also an object of the invention to provide a transloader system having an improved position measuring device for a moving rail vehicle.

SUMMARY OF THE INVENTION

These objects and others which will become apparent hereinafter are attained in accordance with the invention by providing over a measuring stretch along a railway track, a multiplicity of switch elements, hereinafter referred to as an array, from which respective elastic switch tabs form sensors which can mechanically actuate the electric switches. According to the invention, moreover, the switch tabs or actuators are elastic and are so configured or positioned that they are always engaged by a wheel of the vehicle even in the maximum offsetting of the vehicle wheel from a straight line or path, i.e. even in a maximum sinusoidal movement of the wheel upon the rail, and even in the case of significant wear of the wheel or the rail. The actuators are intended to engage either the felly of the wheel or the flange thereof so that the wheel can depress the actuators in succession and operate the switches successively. The switch tabs are so configured and/or arranged that they extend close to the head of one of the two rails and the switch elements are spaced apart at only a small distance from one another.

More particularly, a device for measuring the position of a railway vehicle having a wheel with a felly portion and a flange portion can comprise, in combination with one of the rails, i.e. the rail along which this wheel travels, a multiplicity of switch elements arrayed closely along the one of the rails over an entire length of a measuring stretch and successively actuatable to signal a position of the wheel along the track; and respective elastic actuators assigned to the switch elements and extending toward the rail close to a head thereof and into a path of a periphery of one of the portions of the wheel, the actuators being constructed and arranged to be engaged by the wheel in all positions of sinusoidal travel thereof along the track and under all wear conditions thereof.

Because of the configuration and arrangement of the switching tabs or actuators and the reduced spacing of the individual switch elements from one another, a very precise detection of the position of the vehicle is ensured while the latter is in motion for control of a transloader with high precision with respect to alignment with the railway vehicle and establishment of the correct speed thereof.

The actuators can be part of the switch elements themselves or can be independent therefrom and mounted separately from the switch elements. It has been found to be especially advantageous to use as the switch elements commercial switches which can be provided with special actuators as described previously for the specific purpose of the invention.

The switch elements can be individually elastically mounted or can be mounted elastically in groups or assemblies.

To prevent damage to the switch elements, they are preferably mounted below the level of the top of the rail head and, if desired, the measuring stretch can comprise at least one circuit board upon which the switch elements are mounted.

Alternatively and, in accordance with another feature of the invention, at least one metal plate can be provided upon which the switch elements are attached by screws, rivets or an adhesive.

In a preferred embodiment of the invention, the measurement stretch comprises at least one bar of plug and socket contact elements into which the switch element can be plugged to effect electrical connection, for example, from terminals projecting from the switch element and received in respective socket openings of the socket bar.

In accordance with a further feature of the invention, the actuators are so configured that they can also take up transverse forces, i.e. forces transverse to the rail or to the array. A shifting of the actuator by the passage of the wheel is, however, excluded in the longitudinal direction. i.e. the direction in which the rail extends.

The free end of the actuator can have a bend which can be the portion of the actuator engaged by the felly of the passing wheel, the bend protecting the actuator against damage by the wheel and limiting the force applied by the actuator to the switch element.

The switch element can be covered by a U-shaped sheet metal protective cover which prevents damage to the switch elements and contamination thereof. A U-shaped bend can open upwardly in each actuator and can receive a downwardly-extending shank of the U-shaped cover.

At least in the region of engagement of the felly portion or the flange portion of the wheel with the actuator, the latter can be provided with a protective coating which significantly increases the useful life of the actuator. The life of the actuator can also be increased by forming the free end of the actuator with a roller which is engageable by the wheel and which reduces the transverse forces which are applied to the actuator and, of course, any tendency of the actuator to be entrained by the wheel in any direction other than a downward direction. The measurement precision of the device according to the invention is independent of the length of the measuring stretch and depends only upon the spacing of the switch elements from one another. The switching elements can thus be located directly adjacent one another and, if they are commercially available switching elements, can have a width of for example 6.5 mm which means that the spacing between actuators can also at most be 6.5 mm and this is then the resolution of the measurement.

As a general proposition, the spacing of the individual switching elements from one another should be as small as possible but usually will be at least the thickness of the switching elements.

BRIEF DESCRIPTION OF THE DRAWING

The above and other objects, features, and advantages will become more readily apparent from the following description, reference being made to the accompanying drawing in which.

SPECIFIC DESCRIPTION

Figure 10:
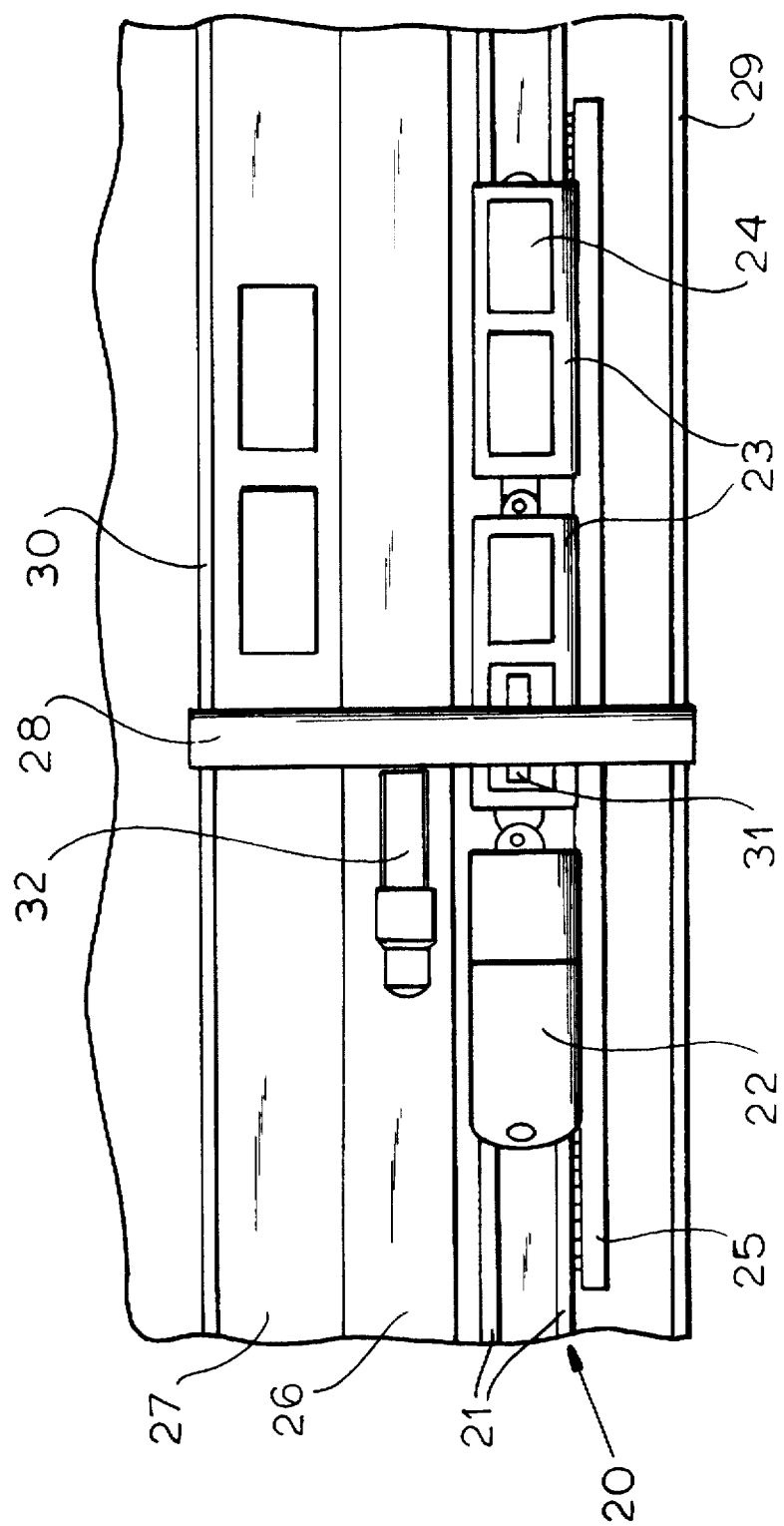
FIG. 10 is a diagrammatic plan view showing a transfer station according to the invention.

In FIG. 10 we have shown a transloading system which comprises a track 20 having two rails 21 upon which a rail vehicle 22 is displaceable with cars 23 which carry load units 24. Along this track 20, a measuring stretch 25 is provided utilizing the features of FIGS. 1-9.

Parallel to this track 20 can be a roadway 26 and a storage facility represented at 27. A transloader in the form of a portal crane 28 is displaceable on rails 29 and 30 parallel to the rails 21 with the speed of the railroad vehicle 22, 23 and has a spreader 31 which can engage the load units 24 which can be standard containers. In the position shown in FIG. 10, the transloader 28 can engage a load unit and transfer it laterally onto a truck 32 traveling along the roadway 26.

Once the load unit is lifted from the rail car 23, moreover, the transloader 28 can come to a standstill and the load unit can be transported to the storage region 27 where it can be deposited to await further transport. Alternatively, once a load unit is picked up by the transporter 28, it can be synchronized with the rail vehicle 22, 23 and can deposit the load unit on a vacant space on a car 23. For this purpose, the transporter is provided with a drive 33 represented in block form in FIG. 9 and the drive can be operated by the computer 34 to synchronize the transporter 28 with the rail vehicle 22, 23.

The computer 34 receives an input from switches 35 of a measuring stretch 36 which is provided with an electric current source 37 so that the successive operation of the switches signals to the computer the location of a wheel of the rail vehicle along the measuring stretch and hence the position of that vehicle.

Figure 5:
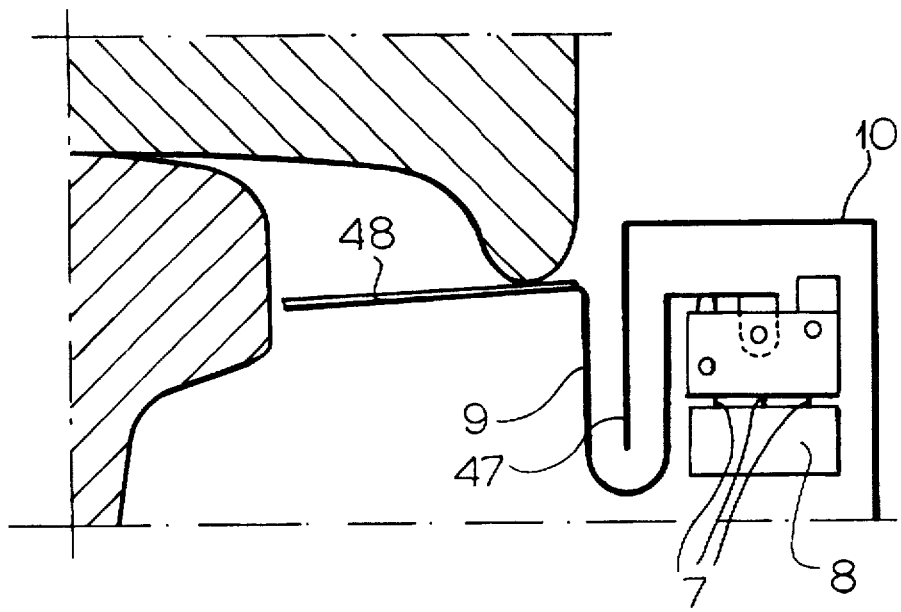
Figure 6:
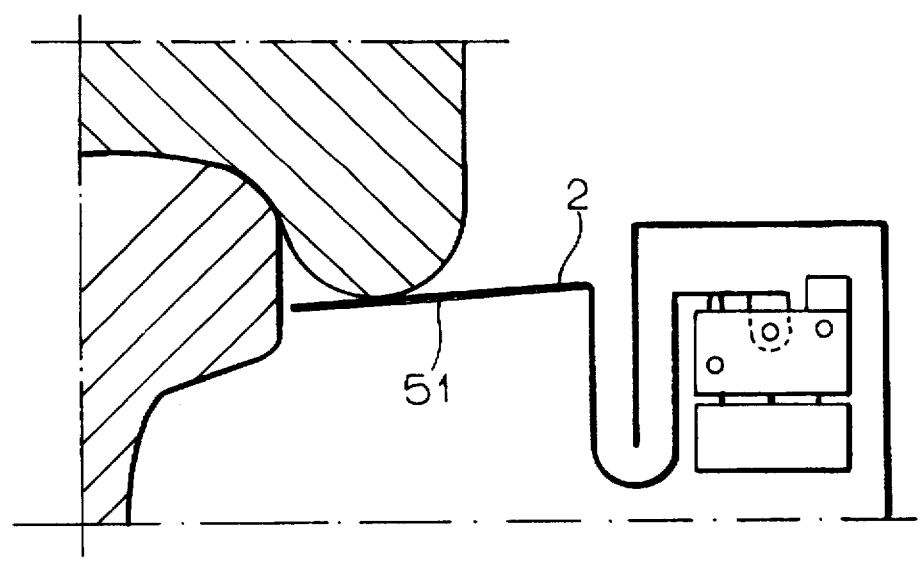
Figure 7:
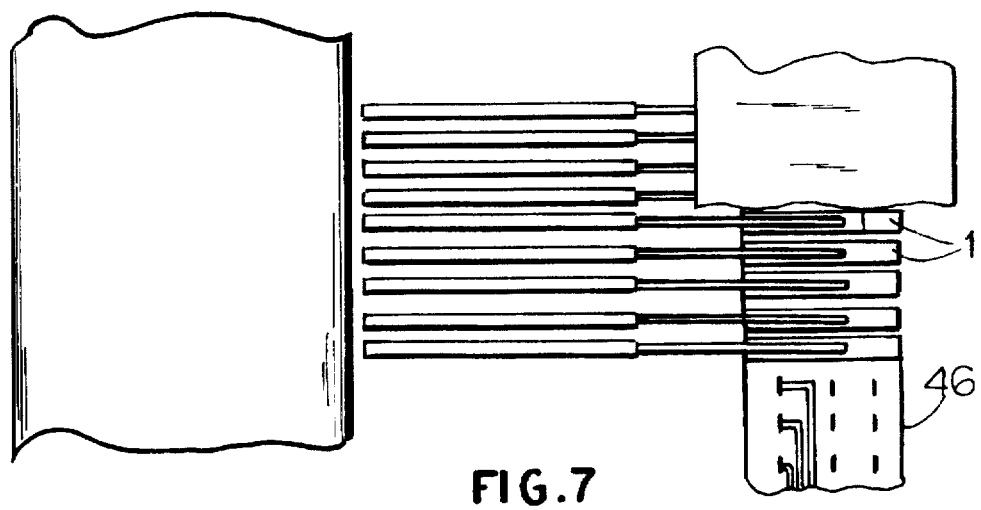
FIG. 7 is a fragmentary plan view illustrating an array of switch elements in accordance with the invention corresponding to the configuration of FIG. 4.

FIGS. 1-6 show various arrangements of switch elements 1 located in succession along the measuring stretch as indicated for example in FIG. 7 where a number of switches 1 are shown practically side by side. In practice, these switch elements may be actually side by side in contacting relationship but, in any event, should be as close as possible together so that a maximum number of switches can be provided along the measuring stretch of given length. Each switch element 1 is provided with an actuator. The actuators are represented generally at 2 and can comprise the elongated tongues 2' connected to a single sheet metal member 2" so as to be tabs of the sheet metal member 2" to which the switches 1 can be connected by screws 38 as shown, for example, in FIG. 8.

Adhesive patches 39 or rivets 40 can also be used to attach the switch elements 1 to a sheet metal support. The actuating buttons 41 on the switches 1 may be depressed against internal spring forces to operate the switch. The switches 1 may be spring mounted as represented at 42 so that each switch may have a respective spring mount or a number of switches may be assembled together with a common spring mount.

Figure 1:
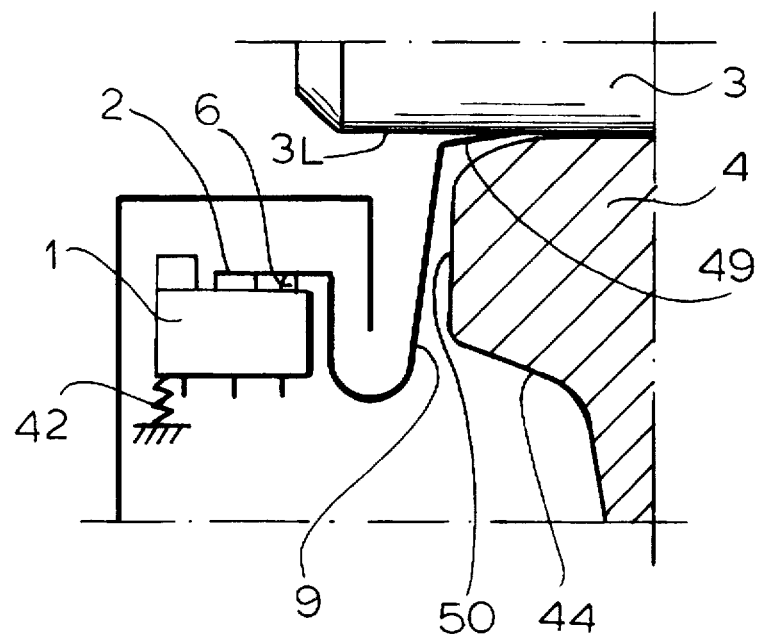
FIGS. 1-3 are partial diagrammatic cross sections showing three embodiments of actuators in a device according to the invention engaging the felly portion of a railroad wheel with different positions of the wheel in the sinusoidal travel of the wheel along a track.
Figure 2:
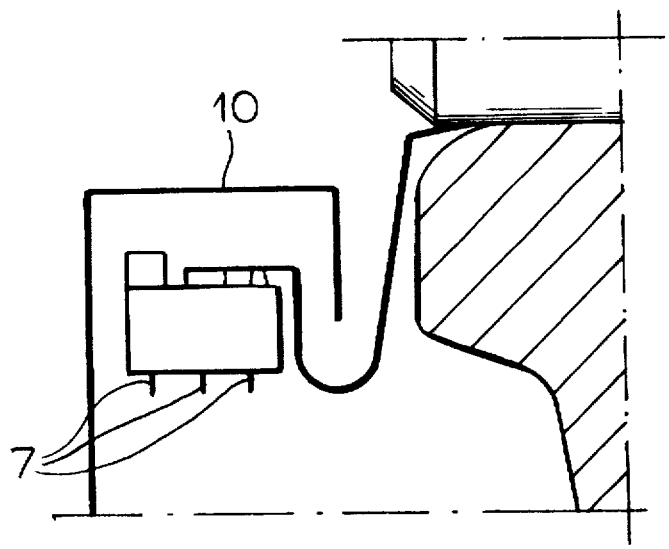
Figure 3:
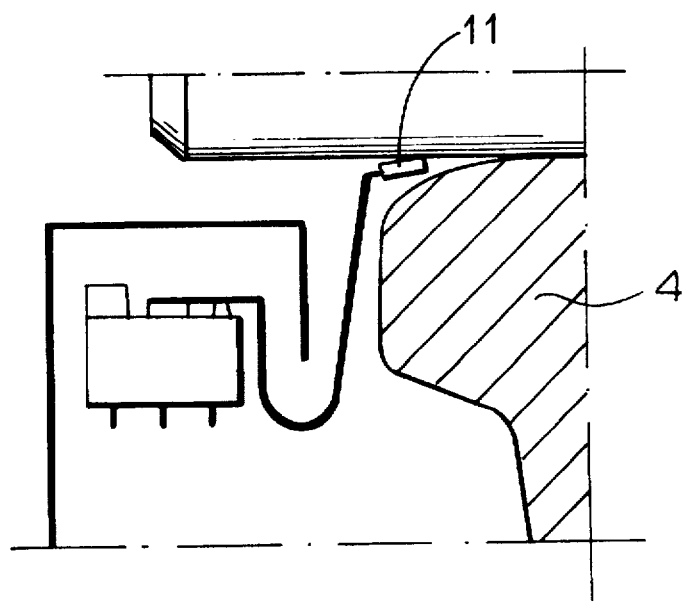
Figure 4:
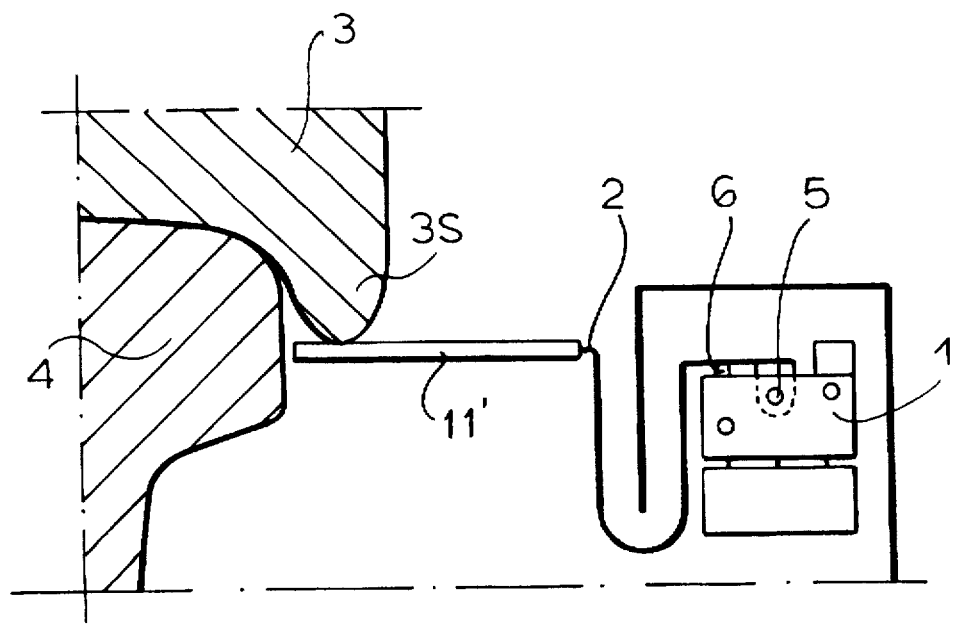
FIGS. 4-6 are similar views showing the engagement of a flange portion of the wheel in different positions of the latter in its sinusoidal movement.

The actuators 2 can be engageable with the periphery of the rail wheel 3, i.e. with the felly portion 3L in the case of FIGS. 1-3 or with the flange 3S in the case of FIGS. 4-6. The wheels 3 travel along the rail which is here represented at 4 and has a head 44 below the top of which the switches 1 are located to minimize the danger of damage to the switch 1.

In the embodiments of FIGS. 4-6, the actuator is pivotal at 5 on the switch 1 and in FIGS. 1-6, the button which must be depressed to operate the switch 1 is represented by the reference numeral 6. When the switches of the measurement stretch are successively operated, signals are delivered to the computer 34 to control the position of the transloader via the drive 33.

Figure 8:
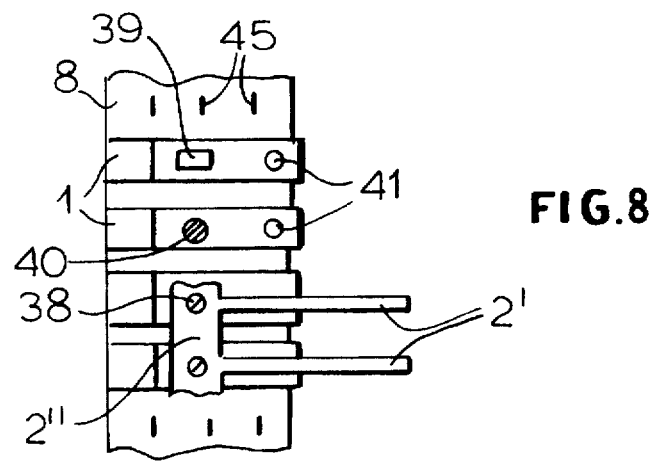
FIG. 8 is a fragmentary plan view showing another embodiment of the invention.
Figure 9:
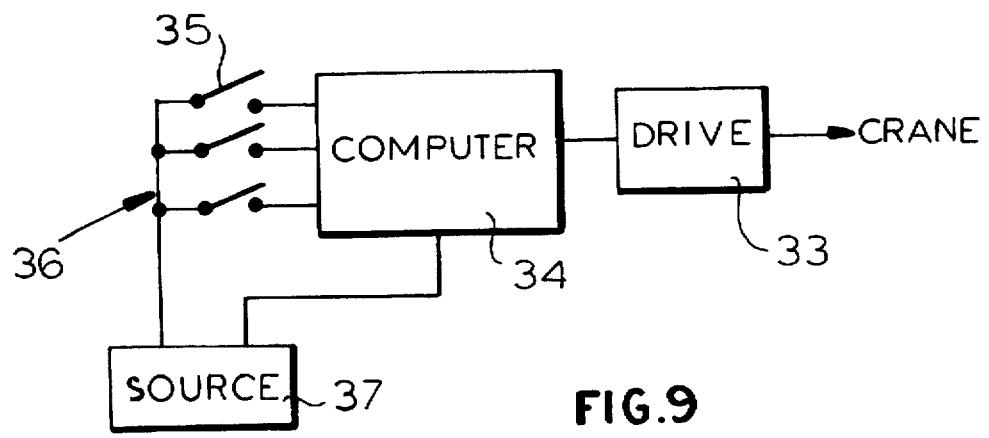
FIG. 9 is a block diagram illustrating a system for registering the position of the rail vehicle utilizing the devices of FIGS. 1-8.

The switch elements 1 can be provided with contacts 7 which can plug into a socket bar 6 making the electrical connection to the source 37 and the computer 34. As shown in FIG. 8, the socket slots are represented at 45 in the contact bar 8. In the embodiment of FIG. 7, however, a printed circuit board is provided at 46 and the switches 1 are soldered in place.

The actuators 2 have downwardly extending U-shaped bends 9 into which the downwardly extending shank 47 of an inverted-U sheet metal cover 10 can engage. In the region of contact with the felly 3L or the flange 3S, the free end of the actuator can be provided with a roller 11 or 11' or with a nonfriction coating 48 of polytetrafluoroethylene or the like to limit wear.

As can be seen from FIGS. 1–3, a bent free end 49 is provided on the actuator which is positioned above the head 44 inwardly of the flank 50 of that head in the embodiment of FIGS. 1–3 so that even with maximum wear of the rail 4 and of the wheel 3, and then with a sinusoidal movement of the wheel 3 to the left and the right on the track 4, the felly 3L of the wheel will always engage the actuators 2 to operate the switches.

In the embodiments of FIGS. 4–6, the free ends 51 of the actuators 2 are long enough to engage the flange 3S in all positions of the wheel 3 in its sinusoidal movement back and forth on the rail 4.

We claim:

1. A device for measuring position of a railway vehicle traveling along a track comprising a pair of rails, said vehicle having a wheel running on said one of said rails and formed with a felly portion and a flange portion disposed along a flank of said one of said rails, said device comprising in combination with said one of said rails:

a multiplicity of switch elements arrayed closely along said one of said rails over an entire length of a measuring stretch and successively actuatable to signal a respective position of said wheel for continuously defining a position of the railway vehicle along said track; and respective elastic actuators assigned to said switch elements including flexible elongated tongues extending toward said rail close to a head thereof and into a path of a periphery of one of said portions of said wheel, said flexible tongues being constructed and arranged to be continuously engaged by said wheel in all positions of sinusoidal travel thereof along said track and under all wear conditions of the wheel and track.

2. A device for measuring position of a railway vehicle traveling alone a track comprising a pair of rails, said vehicle having a wheel running on said one of said rails and formed with a felly portion and a flange portion disposed along a flank of said one of said rails, said device comprising in combination with said one of said rails:

a multiplicity of switch elements arrayed closely along said one of said rails over an entire length of a measuring stretch and successively actuatable to signal a position of said wheel along said track:

respective elastic actuators assigned to said switch elements and extending toward said rail close to a head thereof and into a path of a periphery of one of said portions of said wheel, said actuators being constructed and arranged to be engaged by said wheel in all positions of sinusoidal travel thereof along said track and under all wear conditions of the wheel and track; and means for elastically supporting each of said switch elements.

3. A device for measuring position of a railway vehicle traveling along a track comprising a pair of rails, said vehicle having a wheel running on said one of said rails and formed with a felly portion and a flange portion disposed along a flank of said one of said rails, said device comprising in combination with said one of said rails:

a multiplicity of switch elements arrayed closely along said one of said rails over an entire length of a measuring stretch and successively actuatable to signal a position of said wheel along said track; and respective elastic actuators assigned to said switch elements and extending toward said rail close to a head thereof and into a path of a periphery of one of said portions of said wheel, said actuators being constructed and arranged to be engaged by said wheel in all positions of sinusoidal travel thereof along said track and under all wear conditions of the wheel and track; and means elastically supporting said switch elements in groups thereof.

4. A device for measuring position of a railway vehicle traveling along a track comprising a pair of rails, said vehicle having a wheel running on said one of said rails and formed with a felly portion and a flange portion disposed along a flank of said one of said rails, said device comprising in combination with said one of said rails:

a multiplicity of switch elements arrayed closely along said one of said rails over an entire length of a measuring stretch and successively actuatable to signal a position of said wheel along said track; and respective elastic actuators assigned to said switch elements and extending toward said rail close to a head thereof and into a path of a periphery of one of said portions of said wheel, said actuators being constructed and arranged to be engaged by said wheel in all positions of sinusoidal travel thereof along said track and under all wear conditions of the wheel and track, said actuators having free ends formed with respective bends.

5. The device defined in claim 4, wherein said switch elements are disposed below a level of the top of said head.

6. The device defined in claim 4, further comprising at least one circuit board extending along said stretch, a plurality of said switch elements being soldered onto said circuit board.

7. The device defined in claim 4, further comprising at least one metal plate on which said switch elements are attached by a screw, a rivet or an adhesive.

8. The device defined in claim 4, further comprising at least one plug-and-socket connector electrically connected to said switch elements.

9. The device defined in claim 4, wherein said actuators are configured to absorb forces transverse to said array.

10. The device defined in claim 4, further comprising a U-shaped sheet metal element covering said array.

11. The device defined in claim 10 wherein said actuators have downwardly extending bends and said U-shaped sheet metal element has a shank extending into said bends.

12. The device defined in claim 11 wherein said actuators have free ends engageable by said wheel and provided with a wear-resistant covering.

13. The device defined in claim 11 wherein said actuators have free ends engageable with said wheel and formed with respective rollers.

14. The device defined in claim 11 wherein said switch elements are spaced apart by about 5 mm.

15. The device defined in claim 14 wherein said actuators have free ends engageable with said flange portion and of a length sufficient to be contacted by said flange portion in all positions of sinusoidal travel of said wheel on said one of said rails.

16. The device defined in claim 14 wherein said actuators have free ends disposed directly above said top of said one of said rails.

17. The device defined in claim 14, further comprising a computer operatively connected to all of the switch elements of said array for signaling said position of said vehicle.

18. The device defined in claim 17, further comprising a transloader for transferring load units from said vehicle and to said vehicle and operated by said computer.

* * * * *